(12) United States Patent
Pallante

(10) Patent No.: US 7,922,590 B2
(45) Date of Patent: Apr. 12, 2011

(54) GREASE REDUCTION INSERT

(75) Inventor: Thomas Pallante, Waterford, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 445 days.

(21) Appl. No.: 11/938,455

(22) Filed: Nov. 12, 2007

(65) Prior Publication Data

US 2009/0124397 A1 May 14, 2009

(51) Int. Cl.
*F16D 3/205* (2006.01)

(52) U.S. Cl. .......................................... 464/11; 464/905

(58) Field of Classification Search ................ 464/7, 11, 464/111, 146, 905
See application file for complete search history.

(56) References Cited

U.S. PATENT DOCUMENTS

| | | | |
|---|---|---|---|
| 2,386,754 A * | 10/1945 | Snyder | 464/7 |
| 3,583,244 A | 6/1971 | Teinert | |
| 3,613,396 A * | 10/1971 | Drevard et al. | 464/111 |
| 3,664,152 A | 5/1972 | Micielinski | |
| 5,954,587 A | 9/1999 | Jacob et al. | |
| 6,402,999 B1 | 6/2002 | Sadr et al. | |
| 6,579,187 B2 | 6/2003 | Ramey | |
| 7,278,894 B2 * | 10/2007 | Lyon et al. | 464/146 X |

OTHER PUBLICATIONS

'Closed cell vs. Open Cell Foam' [retrieved on Mar. 29, 2010] Retrieved from the Internet: URL: www.iowafoam.com/closed%20cell20vs.doc.*

* cited by examiner

*Primary Examiner* — Greg Binda
(74) *Attorney, Agent, or Firm* — Jennifer M. Brumbaugh; Rader, Fishman & Grauer PLLC

(57) ABSTRACT

An articulating joint apparatus includes a first rotational member having an axis, a second rotational member coupled with and positioned generally coaxial to the first rotational member, and a boot cover assembly for sealing at least part of the first rotational member to the second rotational member. The boot cover assembly is selectively coupled to both the first rotational member and the second rotational member. The joint apparatus also includes an insert positioned at least partially between the first rotational member and the second rotational member. The insert will deform in response to axial movement of the second rotational member relative to the first rotational member.

14 Claims, 7 Drawing Sheets

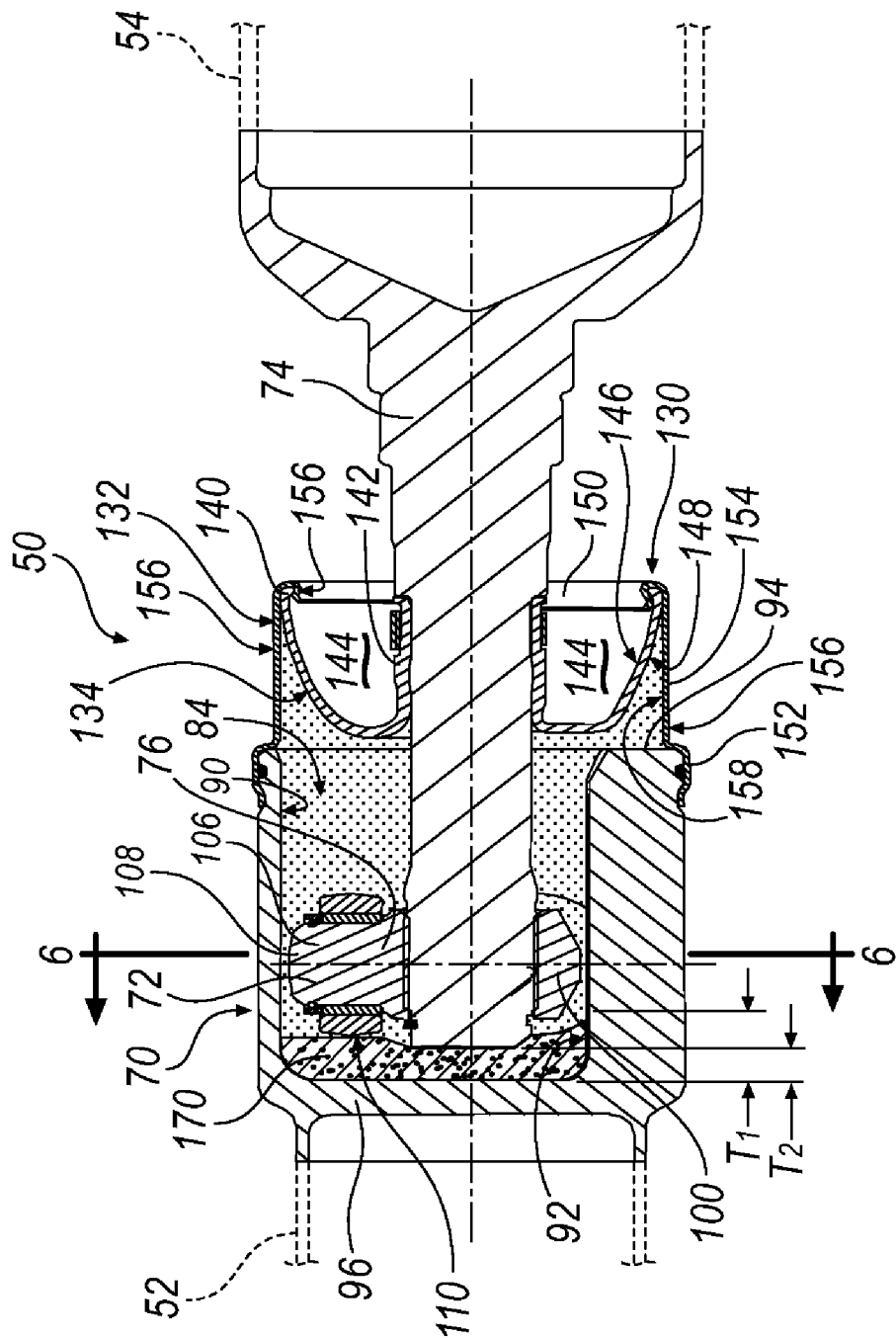

US 7,922,590 B2

GREASE REDUCTION INSERT

TECHNICAL FIELD

The disclosure relates generally to articulated joints, and more specifically to a system and method for reducing the volume of lubricant for an articulated joint.

BACKGROUND

Constant velocity joints (CVJ joints) and other rotational joints are common components in automotive vehicles. Typically, constant velocity joints are used where a transmission of constant velocity rotating motion is required. The common types of constant velocity joints are plunging tripod, a fixed tripod, a plunging ball joint and a fixed ball joint. These types of joints are currently used in front wheel drive vehicles, rear wheel drive vehicles and on propeller shafts found in rear wheel drive, all wheel drive, and four wheel drive vehicles. The constant velocity joints are generally grease lubricated for life and sealed by a sealing boot when used on driveshafts or half shafts. Therefore, constant velocity joints are sealed in order to retain grease inside the joint and keep contaminates, such as dirt and water out of the joint. To achieve this protection the constant velocity joint is usually enclosed at the opened end of an outer race by a sealing boot made of a rubber, thermoplastic, or silicone type material. The opposite end of the outer race generally is enclosed by a dome or cap, known as a grease cap in the case of a disk type joint. A mono block or integral stem and race design style joint is sealed by the internal geometry of the outer race. This sealing and protection of the constant velocity joint is necessary because contamination of the inner chamber of the joint generally will cause damage to the joint.

A main function of the constant velocity joint is the transmission of rotational forces and torque. A plunging joint will transmit rotational velocity while permitting relative axial displacement within the joint. Generally, a tripode joint operates as a plunging constant velocity joint while providing some degree of axial articulation. In typical joint assemblies, a variety of bolted joint designs are used to assemble a joint to a propshaft or halfshaft within the automotive vehicle. These propshaft and halfshaft assemblies are typically assembled prior to installation within a driveline of a vehicle.

When a joint is installed within a vehicle, the lubricant within the joint will tend to exert a force on the boot when the joint is rotating thus causing deformation. Deformation of the boot is undesirable because damage to the boot my result from boot-to-boot contact. Damage to the boot causes loss of lubricant from the joint and contamination of the joint with water and debris. Additionally, lubricant is a very expensive component of a joint. Reducing the volume of lubricant is desirable for cost savings and to minimize the forces exerted on the boot and causing deformation. However, decreasing the volume of lubricant in a joint, with nothing more, may result in a joint with inadequate lubrication of the internal components resulting in a less effective joint. What is needed, therefore, is a system for decreasing the volume of lubricant in a joint while still maintaining adequate lubrication of the internal components.

SUMMARY

An embodiment includes a joint apparatus including a first rotational member having an axis, a second rotational member coupled with and positioned generally coaxial to said first rotational member, and a boot cover assembly for sealing at least part of the first rotational member to the second rotational member. The boot cover assembly is selectively coupled to both the first rotational member and the second rotational member. The joint apparatus also includes an insert positioned at least partially between the first rotational member and the second rotational member. The insert will deform in response to axial movement of the second rotational member relative to the first rotational member.

BRIEF DESCRIPTION OF THE DRAWINGS

Referring now to the drawings, preferred illustrative embodiments are shown in detail. Although the drawings represent some embodiments, the drawings are not necessarily to scale and certain features may be exaggerated, removed, or partially sectioned to better illustrate and explain the present invention. Further, the embodiments set forth herein are not intended to be exhaustive or otherwise limit or restrict the claims to the precise forms and configurations shown in the drawings and disclosed in the following detailed description.

FIG. 7 is a partial sectional view of a portion of the propshaft of FIG. 2.

DETAILED DESCRIPTION

Figure 1:
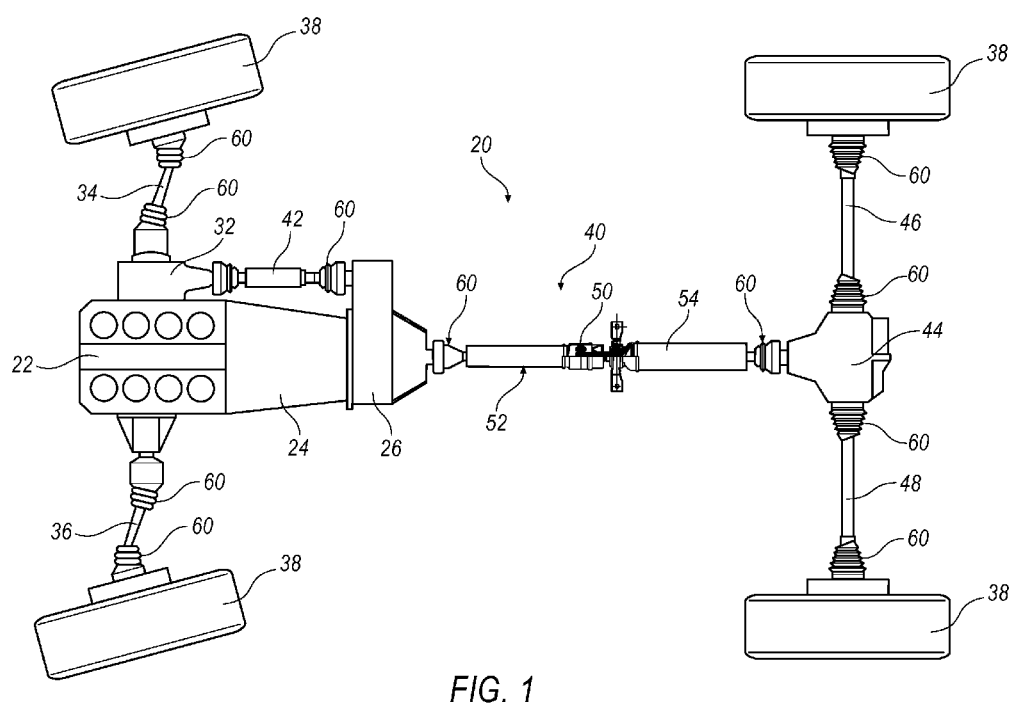
FIG. 1 is a top view of a driveline system.

FIG. 1 illustrates a driveline 20 of a vehicle (not shown). The driveline 20 includes an engine 22 that is connected to a transmission 24 and a power take off unit 26. A front differential 32 has a right hand front half shaft 34 and a left hand front half shaft 36, each of which are connected to a wheel 38 and deliver power to those wheels 38. The power take off unit 26 has a propeller shaft 40 and a front wheel propeller shaft 42 extending therefrom. The front wheel propeller shaft 42 connects the front differential 32 to the power take off unit 26. The propeller shaft 40 connects the power take off unit 26 to a rear differential 44, wherein the rear differential 44 includes a rear right hand side shaft 46 and a rear left hand side shaft 48, each of which ends with a wheel 38 on one end thereof.

Figure 2:
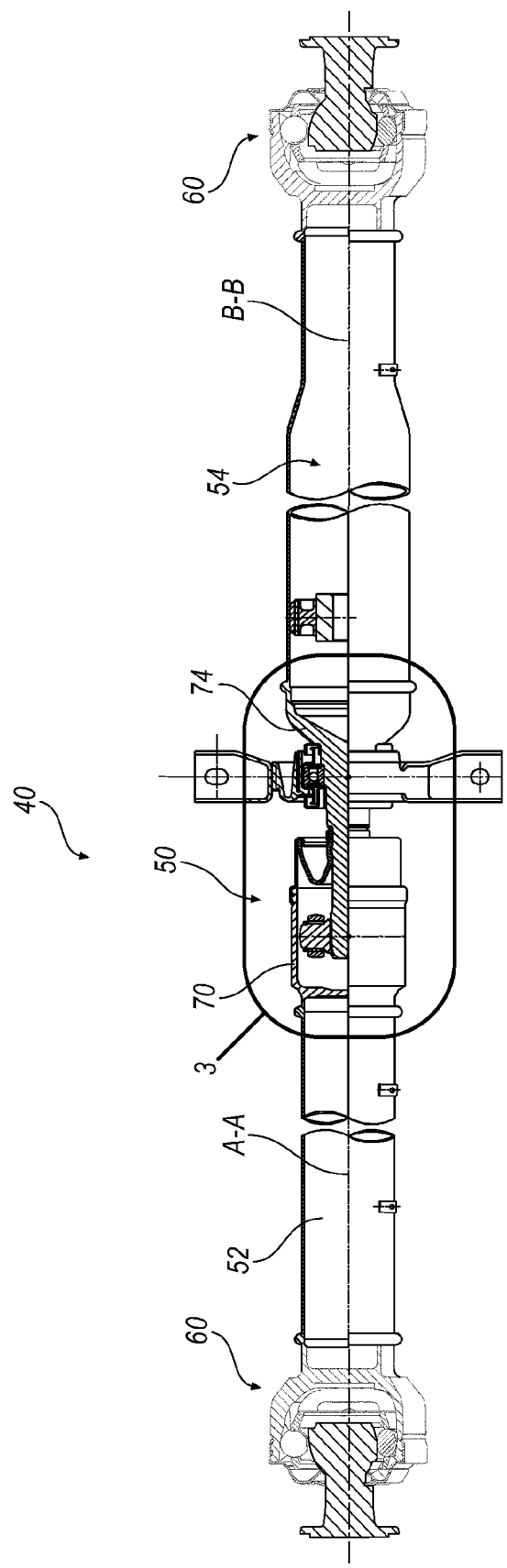
FIG. 2 is a partial sectional top view of the propshaft illustrated in FIG. 1.

The propeller shaft 40, as best seen in FIG. 2, includes a front prop shaft 52, a rear prop shaft 54, an articulated tripode joint 50 and two high speed constant velocity joints 60. The front prop shaft 52 is defined by an axis A-A, and the rear prop shaft 54 is defined by an axis B-B. The constant velocity joints transmit power to the wheels 38 through the driveshaft 40 even if the wheels or the shaft have changing angles due to steering and suspension jounce and rebound. A constant velocity joint 60 is also located on both ends of the half shafts that connect to the wheel 38 and the rear differential 44. On both ends of the right hand front half shaft 34 and left hand front half shaft 36 are constant velocity joints 60.

The constant velocity joints 60 may be of any of the standard types known, such as plunging tripod, cross groove joint, fixed ball joint, fixed tripod joint, or double offset joints, all of which are commonly known terms in the art for different varieties of constant velocity joints. The constant velocity joints 60 allow for transmission of constant velocities at angles which are found in everyday driving of automotive vehicles in both the half shafts and prop shafts of these vehicles.

The driveline 20 represents an all wheel drive vehicle, however it should be noted that the embodiment of the constant velocity joints 60 of the current disclosure can also be used in rear wheel drive vehicles, front wheel drive vehicles, all wheel drive vehicles and four wheel drive vehicles.

Figure 3:
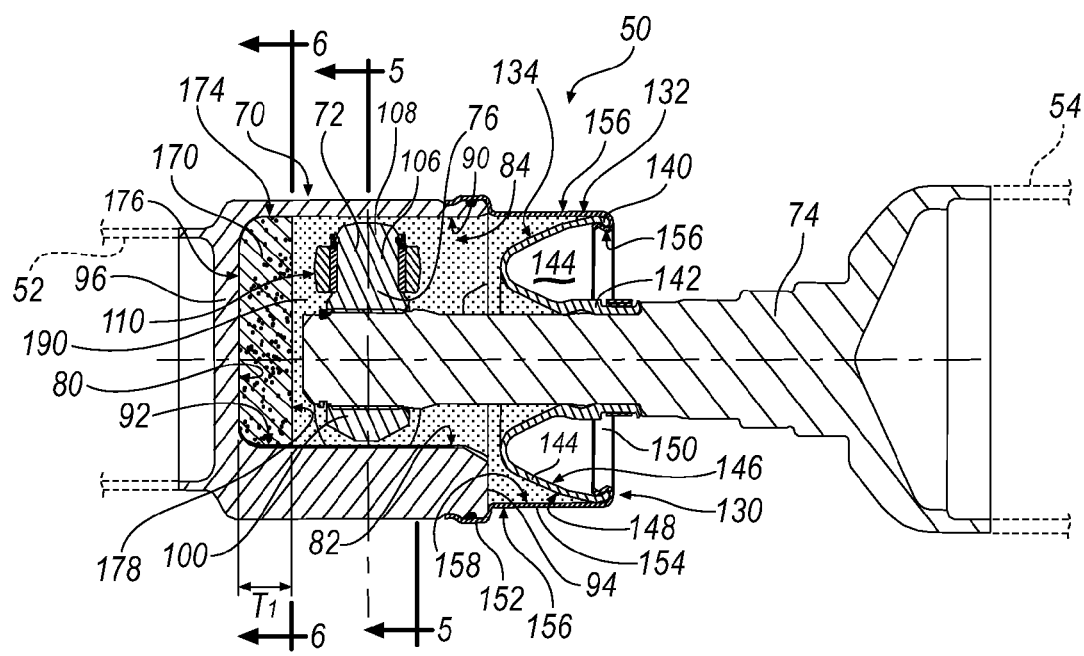
FIG. 3 is a partial sectional view of a portion of the propshaft of FIG. 2.
Figure 4:
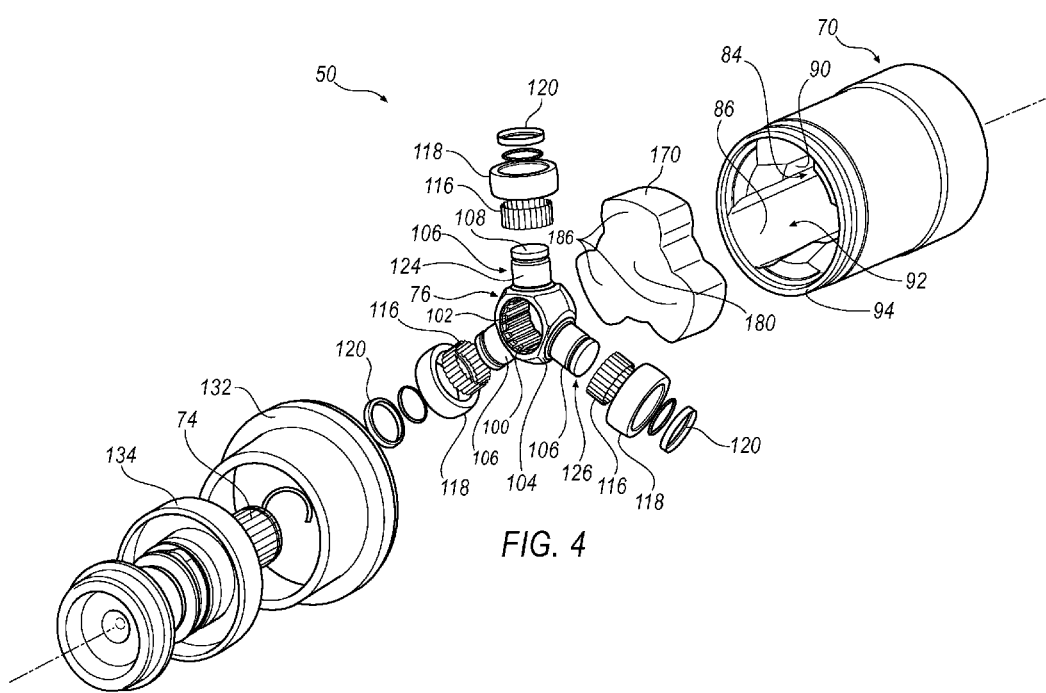
FIG. 4 is an exploded perspective view of a portion of a propshaft of FIG. 2.
Figure 5:
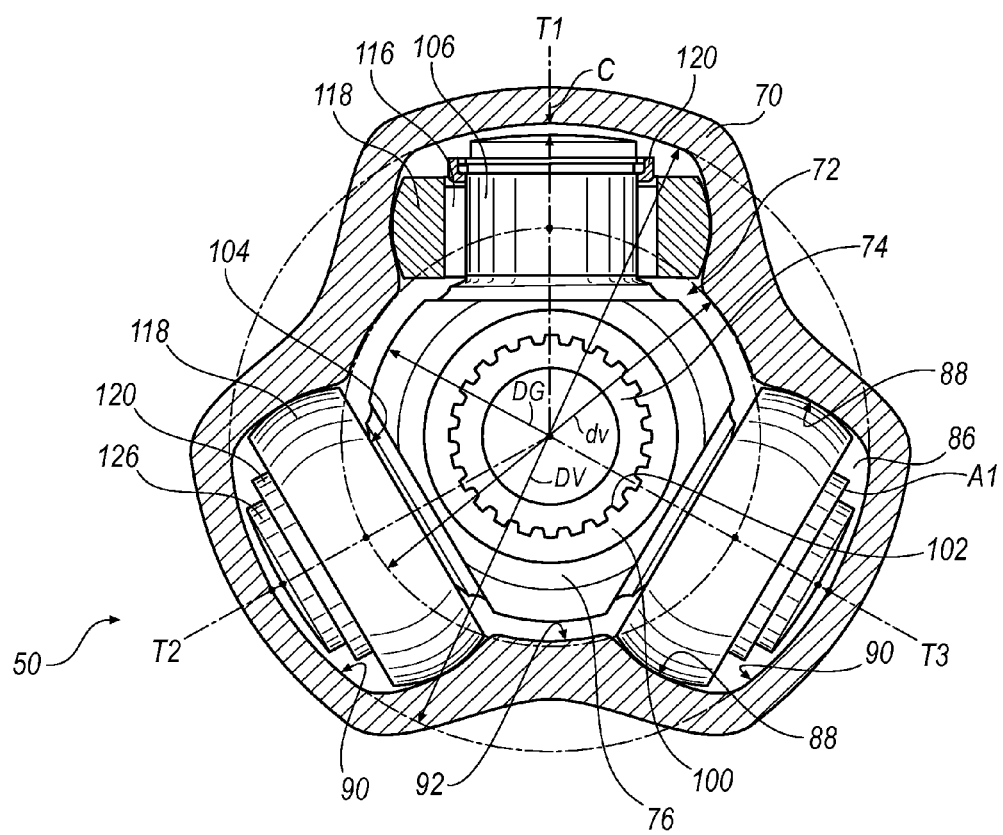
FIG. 5 is a sectional view taken along broken line 5-5 of FIG. 3, with some section graphics removed for clarity.

As best seen in FIGS. 3-5, the joint 50 includes a tulip, first rotational member, or an outer joint portion 70, connected to the front prop shaft 52, and a second rotational member, or an inner joint portion, 72. The second rotational member 72 includes a shaft 74 connected to the rear prop shaft 54. The second rotational member 72 also includes a tripode star, or spider, 76 splined to the shaft 74. As best seen in FIGS. 2 and 3, the first rotational member 70 is also generally defined by the axis A-A of the front prop shaft 52 and the shaft 74 is also generally defined by the axis B-B of the rear prop shaft 54.

The first rotational member 70 is provided with a first inner surface 80 and a second inner surface 82 defining an inner recess 84 having three uniformly circumferentially distributed vaults 86 (see FIG. 4). The vaults 86 form pairs of circumferentially opposed fillet-shaped tracks 88 connected by a vault major surface 90 that extend from an opening end 94 of the first rotational member 70 to a wall 96. The wall 96 is defined, in part, by the first inner surface 80. The tracks 88 of adjacent vaults 86 are connected by a tulip minor surface 92. The spider 76 includes an annular hub portion 100 provided with an aperture 102 for inserting the shaft 74 therein and three uniformly circumferentially distributed trunnion lands 104. As illustrated, the spider 76 is splined to the shaft 74 for rotation therewith. Extending from the hub portion 100 (at each trunnion land 104) are three uniformly circumferentially distributed trunnions 106 having axes T1, T2, and T3 having a trunnion crown 108 at a distal end. One trunnion 106 is interposed into each vault 86. A roller assembly 110 is interposed within each vault 86 with a trunnion 106 interposed therein. Each roller assembly 110 includes bearing needles 116 and rollers 118.

Each roller 118 with bearing needles 116 are axially restrained on each trunnion 106 by a securing ring 120. The roller assemblies 110 are permitted to axially float along axes T1, T2, T3 between the trunnion lands 104 and the securing rings 120. Additionally, a substantially hollow-cylindrical roller carrier (not shown) may be interposed between each trunnion 106 and the bearing needles 116. Generally, the vault major surface 90 is defined by a first vault diameter DV, and the tulip minor surface 92 is defined by a second vault diameter dv (FIG. 5). Each trunnion 106 includes a cylindrical outer surface 124 and a trunnion end 126. When the spider 76 is positioned concentric to the first rotational member 70, a clearance C is generally provided between each trunnion end 126 and vault major surface 90 (FIGS. 3 and 5).

As best illustrated in FIG. 5, the joint 50 may be trisected about the axes A-A and B-B into three generally equal portions. When the joint 50 is in operation with the first rotational member 70 and shaft 74 generally axially aligned, the rotational forces within the joint 50 urge the axes A-A and B-B to be co-axial and the trunnions float within the roller assemblies 110 to provide a generally equal clearance C between each trunnion crown 108 and vault major surface 90.

As best seen in FIG. 3, the joint 50 also includes a boot assembly 130. The boot assembly 130 includes a boot can 132 and a flexible boot 134. The flexible boot 134 includes an outer bead end 140, an inner shaft end 142, a flexible portion 144 extending therebetween, an outer boot surface 146, and an inner boot surface 148. The boot can 132 includes a crimped end 150 that is folded over the bead end 140, a tulip end 152 connected to the first rotational member 70, a generally cylindrical can body 154 extending therebetween, an outer can surface 156, and an inner can surface 158.

Figure 6:
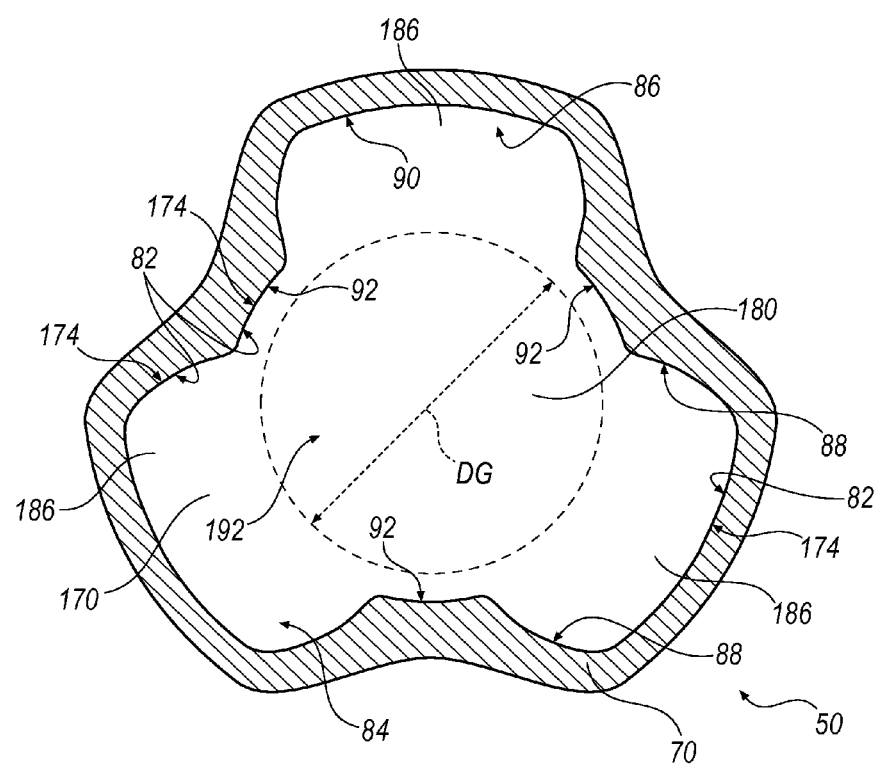
FIG. 6 is a sectional view taken along line 6-6 of FIG. 3.

The joint 50 also includes an insert 170 (FIGS. 3, 4, and 6-8). The insert 170 includes a body defined by a contoured outer surface 174, a first insert surface 176, and a second insert surface 178. As best seen in FIG. 6, the insert also includes a central insert portion 180 having vault insert portions 186 extending therefrom. In the embodiment illustrated, the contoured outer surface 174 closely contours the second inner surface 82. In other embodiments, the contoured outer surface 174 may not closely contour circumferential surfaces of the joint. Although a plunging tripod joint is illustrated, an insert, such as the insert 170 may be used in any other type of joints, including cross groove joints, fixed ball joints, fixed tripod joints, double offset joints and the like.

The joint 50 further includes a predetermined amount of lubricant 190, such as a grease, within the recess 84. This lubricant 190 reduces wear between frictional surfaces and increases joint life. When the joint 50 is rotating, centripetal forces exerted by at least the second inner surface 82 on the lubricant 190 will force the lubricant 190 into the vaults 86 and form a generally cylindrical inner lubricant void 192. In one example, a typical inner lubricant void 192 is illustrated in FIG. 6 generally defining a diameter DG. The diameter DG and the inner lubricant void 192 are both interrupted by the shaft 74/spider 76. That is, when the joint 50 is operating at sufficient speed to create an inner lubricant void 192, the lubricant 190, illustrated in FIGS. 3 and 7, will fill the recess 84 with the exception of the physical space occupied by the shaft 74/spider 76.

As the speed of the joint 50 increases, such as an increase to a speed of several thousand rotations per minute (rpm), the lubricant 190 will be forced away from the axis A-A (centrifuge) due to the rotation of the joint and the lubricant 190 will also be urged such that the lubricant 190 exerts a force on the boot 134. This force exerted on the boot 134 by the lubricant 190 will deform the boot 134 away from the spider 76. Undesirable amounts of deformation of the boot 134 away from the spider 76 may result from the geometry of the joint 50 and the volume of lubricant 190. Accordingly, the force exerted by the lubricant 190 on the boot 134 is related to the amount of lubricant within the joint 50. Stated differently, reducing the volume of lubricant 190 within the joint 50 will result in less force, and therefore, less deformation of the boot 134 at a given rotational speed of the joint 50.

As best seen in comparing FIGS. 3 and 7, the first rotational member 70 may be axially displaced relative to the shaft 74. This relative axial displacement is limited by contact between the shaft 74 and spider 76 and the insert 170 at a full shaft insertion configuration (FIG. 7) and extension of the boot 134 at a shaft extended configuration (not shown). The insert 170 is compressible such that the insert 170 may be deformed in the direction generally along the axis A-A resulting in the insert 170 occupying less volume within the recess 84. In the embodiment illustrated, the insert 170 is constructed of a closed cell foam, although other materials may be used in other embodiments. In a joint 50 that does not include an insert, such as the insert 170, the relative axial displacement would be limited by contact between the shaft 74/spider 76 and the wall 96 at a full shaft insertion configuration (not shown). Therefore, the insert 170 limits contact between the first rotational member 70 and the second rotational member 72, although the configuration of the driveline 20 may also prevent contact.

As also seen in comparing FIGS. 3 and 7, the clearance C between each trunnion end 126 and vault major surface 90 permits the shaft 74 to plunge (relative movement along the axis A-A) relative to the first rotational member 70 as in FIG. 8 and permits at least a portion of the lubricant 190 to pass through the area A1 (FIG. 5) between the trunnions 106 and the second inner surface 82 (at least partially defined by the clearance C).

When the joint 50 is operated, a desirable volume of lubricant is inserted into the joint to lubricate the frictional surfaces and aid in heat transfer. Generally, this volume of lubricant provides a desirable volume of lubricant at the portions of the joint 50 that are within the joint 50 and positioned farther from the axis A-A. That is, the volume of lubricant 190 in a joint may be determined based upon a desirable volume that will ensure that the frictional surfaces are covered during joint 50 operation. In the forgoing example, the desired volume of lubricant 190 is the volume of the joint 50 outside of the lubricant void 190. In other examples, the joint, such as a joint 50 may have any desirable volume of lubricant 190, including a joint completely full of lubricant 190 with no air or lubricant void.

In one embodiment of operation of a joint, such as the joint 50, the joint is assembled as described. When the joint 50 rotates sufficiently to form a generally cylindrical lubricant void 192, the frictional surfaces of the joint 50 are lubricated. Although the volume of lubricant 190 exerts a force on the boot 134, the volume of lubricant adequate to form a lubricant void of equal diameter to the lubricant void 192 in an otherwise identical joint that does not include an insert, such as the insert 170, is greater, resulting in a greater force on the boot of the joint without an insert.

When the joint 50 experiences an axial deflection where the second rotational member 72 is forced toward the wall 96, the insert is compressed. Therefore the presence of the insert 170 will not limit the joint 50 from performing the 'plunge' function of a joint 50 that does not include an insert. Therefore the insert 170 enables the joint 50 to provide a lower volume of lubricant while having a desired amount of lubricant void 192 and permitting a desired amount of joint plunge.

In the embodiment illustrated, the insert 170 will not absorb appreciable amounts of grease, although some absorption of grease may occur, depending upon material selection. Further the material of the insert 170 is desirably durable to withstand heat and compressive pressures due to operation of the joint 50.

In the embodiment illustrated, the insert 170 will axially deform when the second rotational member 72 moves toward the wall 96. Additionally, the insert 170 may axially deform, and may radially deform such that the contoured outer surface 174 of the insert will separate from the tulip major surface 90, due to the generally axial force exerted by the lubricant 190 as the lubricant 190 is centrifuged within a rotating joint 50. This deformation of the insert 170 is preferably minimized by material selection. That is, since the force exerted by the lubricant 190 during operation of the joint 50 is lower than the force exerted by the second rotational member 72 during operation, the material of the insert 170 will compress, or deform, from the thickness T1 to the thickness T2 without appreciably affecting operation of the joint 50 while resisting undesired deflection due to any force exerted by the lubricant 190.

The central insert portion 180 that lies within the diameter DG of the lubricant void 192 does not necessarily displace lubricant 190 during operation of the joint 50, but will direct the lubricant 190 toward the radial surfaces 90, 92 during centrifuging of the lubricant 190. Further, the lubricant 190 may separate into constituent portions due to temperature and shear forces within the joint 50 during operation while performing as described herein.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims.

The invention may be practiced otherwise than is specifically explained and illustrated without departing from its spirit or scope. The scope of the invention is limited solely by the following claims.

What is claimed is:

1. An articulating joint comprising:
   a first rotational member defining an axis;
   a second rotational member coupled with and positioned generally coaxial to the first rotational member;
   a boot assembly for sealing at least part of the first rotational member to the second rotational member, wherein the boot assembly is selectively coupled to both the first rotational member and the second rotational member; and
   an insert having at least one of a continuous top surface and a continuous bottom surface positioned at least partially solely between the first rotational member and the second rotational member, wherein the first rotational member directly contacts the top surface of the insert and the second rotational member directly contacts the bottom surface of the insert, and wherein the insert will at least axially compress or expand, allowing a complete joint plunge, in response to axial movement of the second rotational member relative to the first rotational member.

2. The articulating joint of claim 1, wherein the insert is constructed, at least in part, of a continuous surface closed cell foam.

3. The articulating joint of claim 1, further comprising a predetermined volume of lubricant generally contained within the joint for lubricating surfaces of the joint, wherein at least a portion of the volume of lubricant selectively flows due to rotation of the joint to exert a force on the at least a portion of the boot assembly generally parallel to the axis.

4. The articulating joint of claim 3, wherein at least a portion of the volume of lubricant selectively flows due to rotation of the joint to exert a force on the at least a portion of the insert generally parallel to the axis, and wherein the force of the lubricant on the insert will not appreciably deform the insert.

5. The articulating joint of claim 1, wherein the first rotational member includes an inner recess having a first inside surface extending to a wall portion defining a second inside surface, and wherein the insert will selectively compress as a thickness of the insert measured generally parallel to the axis is reduced when the second rotational member moves toward the wall portion.

6. The articulating joint of claim 5, wherein the insert includes a plurality of lobes, at least one lobe selectively contacts a surface of a vault thereby permitting the insert to limit non-axial rotation relative to the outer joint, while allowing an uninhibited shaft plunge relative to the outer joint portion.

7. An articulated joint comprising:
  a first rotational member having an opening end, an axis, and an inside surface defining, at least in part, an internal vault;
  a second rotational member including a shaft at least partially interposed within the first rotational member and extending from the first rotational member and through the opening end;
  a boot assembly, wherein the boot assembly has a first boot portion connected to the first rotational member and shaft end connected to the shaft; and
  an insert having at least one of a continuous top surface and a continuous bottom surface positioned at least partially solely between the first rotational member and the second rotational member, and wherein the first rotational member directly contacts the top surface of the insert and the second rotational member directly contacts the bottom surface of the insert, and wherein the insert will at least axially compress or expand, allowing a complete joint plunge, in response to axial movement of the second rotational member relative to the first rotational member.

8. The articulated joint of claim 7, wherein the insert selectively prevents the shaft from contacting a surface portion of the first rotational member.

9. The articulated joint of claim 7, wherein the insert will compress in response to an externally applied inward pressure.

10. The articulated joint of claim 7, wherein the insert is constructed, at least in part, of a continuous surface closed cell foam.

11. The articulated joint of claim 7, further comprising a predetermined volume of lubricant generally contained within the joint for lubricating surfaces of the joint, wherein at least a portion of the volume of lubricant selectively flows due to rotation of the joint to exert a force on the at least a portion of the boot assembly generally parallel to the axis.

12. The articulated joint of claim 11, wherein at least a portion of the volume of lubricant selectively flows due to rotation of the joint to exert a force on the at least a portion of the insert generally parallel to the axis, and wherein the force of the lubricant on the insert will not appreciably deform the insert.

13. The articulated joint of claim 7, wherein the first rotational member has three vaults, the second rotational member includes a generally cylindrical trunnion extending into each vault, and wherein each trunnion is circumscribed by a roller assembly that contacts a surface portion of at least one of the three vaults.

14. The articulated joint of claim 7, wherein the first rotational member inside surface includes a first inner surface and a second inner surface, the first inner surface generally defines a first vault diameter, the second inner surface generally defines a radially extending wall, and wherein the insert selectively contours at least one of the first inner surface and the second inner surface.

* * * * *